Figure 1:
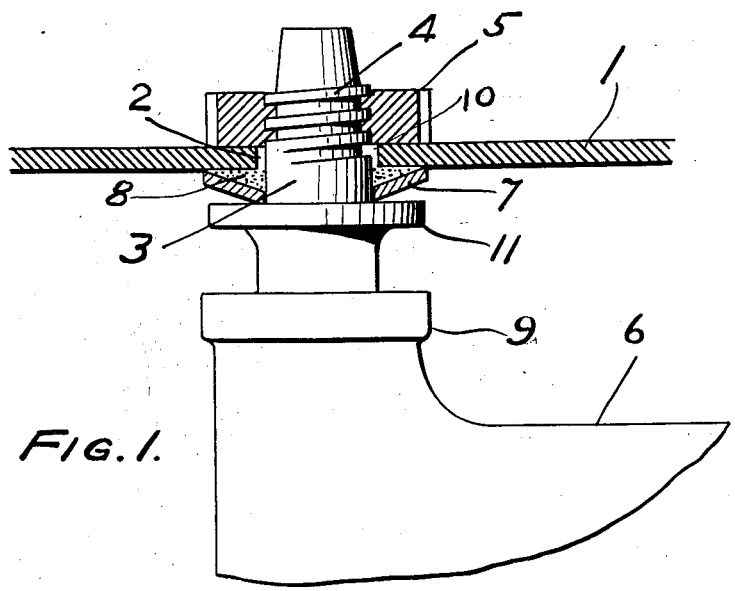

Aug. 9, 1927.

J. L. WOODBRIDGE 1,638,427

ELECTRIC STORAGE BATTERY

Filed Nov. 4, 1926

WITNESS:
Rob R Ketchel.

INVENTOR
Joseph Lester Woodbridge
BY
Augustus B. Stoughton.
ATTORNEY.

Patented Aug. 9, 1927.

1,638,427

UNITED STATES PATENT OFFICE.

JOSEPH LESTER WOODBRIDGE, OF PHILADELPHIA, PENNSYLVANIA.

ELECTRIC STORAGE BATTERY.

Application filed November 4, 1926. Serial No. 146,109.

My invention relates to storage battery cells in which the elements are assembled in a suitable container provided with a closure, through which closure the terminals project in order to provide electrical connection to an external circuit, and it has for its object the provision of a more effective and permanent seal between the terminal post and the cover for preventing the escape of the electrolyte in the cell. This and other objects of the invention will be apparent from the following description taken in connection with the accompanying drawing, in which Figure 1 is a view partly in section of a terminal post seal involving features of the invention and showing the same assembled but not in final position, and Figure 2 is a similar view showing the parts in final position.

In the drawing 1 designates a portion of the cover of a storage battery cell, having a circular opening at 2, through which projects the terminal post 3, there being provided or occurring an annular crevice, space, or clearance between the rim of the hole and the surface of the post as at 10. The post 3 is provided with screw threads 4 adapted for engagement with the seal nut 5. At the base of the terminal post 3 is a shoulder 11 beneath which the post extends to the strap or connecting bar 9 to which the storage battery plates 6 are attached. Other details of the cell have been omitted, as they are not necessary for a full understanding of the invention.

A washer 7 of lead or lead alloy is shown surrounding the post 3 just above the shoulder 11, which washer as shown in the drawing and as first applied is conical or dished in shape with the concave surface upward, thus providing a space between the upper concave surface of this washer and the cylindrical surface of the post 3 and the under surface of the cover 1. This space is filled with a semi-fluid material 8 such as grease or other similar material which is inert, non-conducting and impervious to the electrolyte in the cell. This mass of grease may be applied to the washer after it is in place, resting on the shoulder 11, and before the cover 1 is applied by pouring the molten grease into the space provided for it, and then allowing it to cool and stiffen; or it may be applied by dipping the washer 7 into the grease or similar material in a semi-fluid state before the washer is placed in position, or in any other convenient manner.

Figure 2:
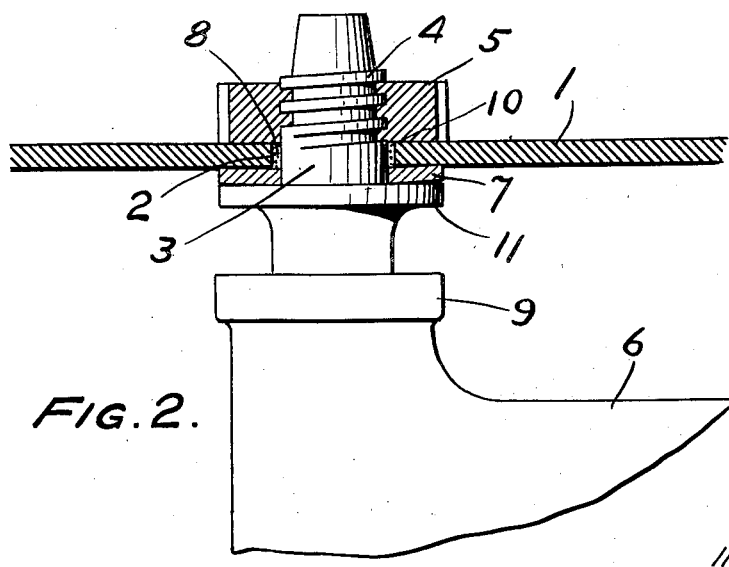

After the parts have been assembled as shown in Fig. 1 of the drawing, the seal nut 5 is screwed down, forcing the washer 7 to flatten down on the shoulder 11. This process will at first force the cover with considerable pressure against the upper edge of the washer 7, thus preventing the escape of the grease from this point. The lower and inner edge of the washer 7 will at the same time be forced against the shoulder 11, preventing the escape of the grease at this point. The result will be that the grease will be forced upward into the space 10 between the cover and the post, filling this space to such an extent as to form an effective seal between the post and the cover to prevent the escape of the electrolyte from the cell.

It has heretofore been the custom to use a washer or gasket of soft rubber between the shoulder 11 and the cover 1 but this device has not proven entirely satisfactory owing to the fact that the rubber will eventually harden and assume a permanent form, losing its resiliency and thus permitting spaces to develop between the washer and the cover and the post through which electrolyte may escape. The invention described above obviates these disadvantages and provides an inexpensive and effective means and method for permanently sealing the joint between the terminal post and the cover.

I claim:

1. In combination a battery terminal post having a shoulder, a closure perforated to receive the terminal post above the shoulder, a cupped washer surrounding the post between the shoulder and the under side of the closure with its concave side towards the closure, and contained in the washer, a semi-fluid sealing material, said washer adapted to be flattened by forcing the closure against the shoulder whereby the compound is forced into the space between the post and cover.

2. The method of sealing the space between the surface of a shouldered storage battery terminal post and the rim of the hole in the cell closure through which the post passes, which consists in arranging a supply of semi-fluid sealing compound in a deformable dished washer and in proximity with said space, and forcing the compound into said space by pressing and flattening said washer between the shoulder and cover.

3. Means for sealing the space between the surface of a shouldered storage battery terminal post and the rim of a hole in a storage battery closure through which the post passes, which means comprise a dished deformable washer adapted to be mounted on the post between the shoulder and cover and provided with a supply of semi-fluid sealing compound confronting the closure, said washer adapted to contact at its inner rim with the shoulder and at its outer rim with the closure to confine the compound, and said washer adapted upon deformation and flattening to inject the compound into said space.

JOSEPH LESTER WOODBRIDGE.